May 7, 1968 F. M. FORSMAN 3,381,899

SPRAY GUN

Filed Sept. 19, 1966 4 Sheets-Sheet 1

INVENTOR.
FREDOLPH M. FORSMAN
BY
Christie, Parker & Hale
ATTORNEYS.

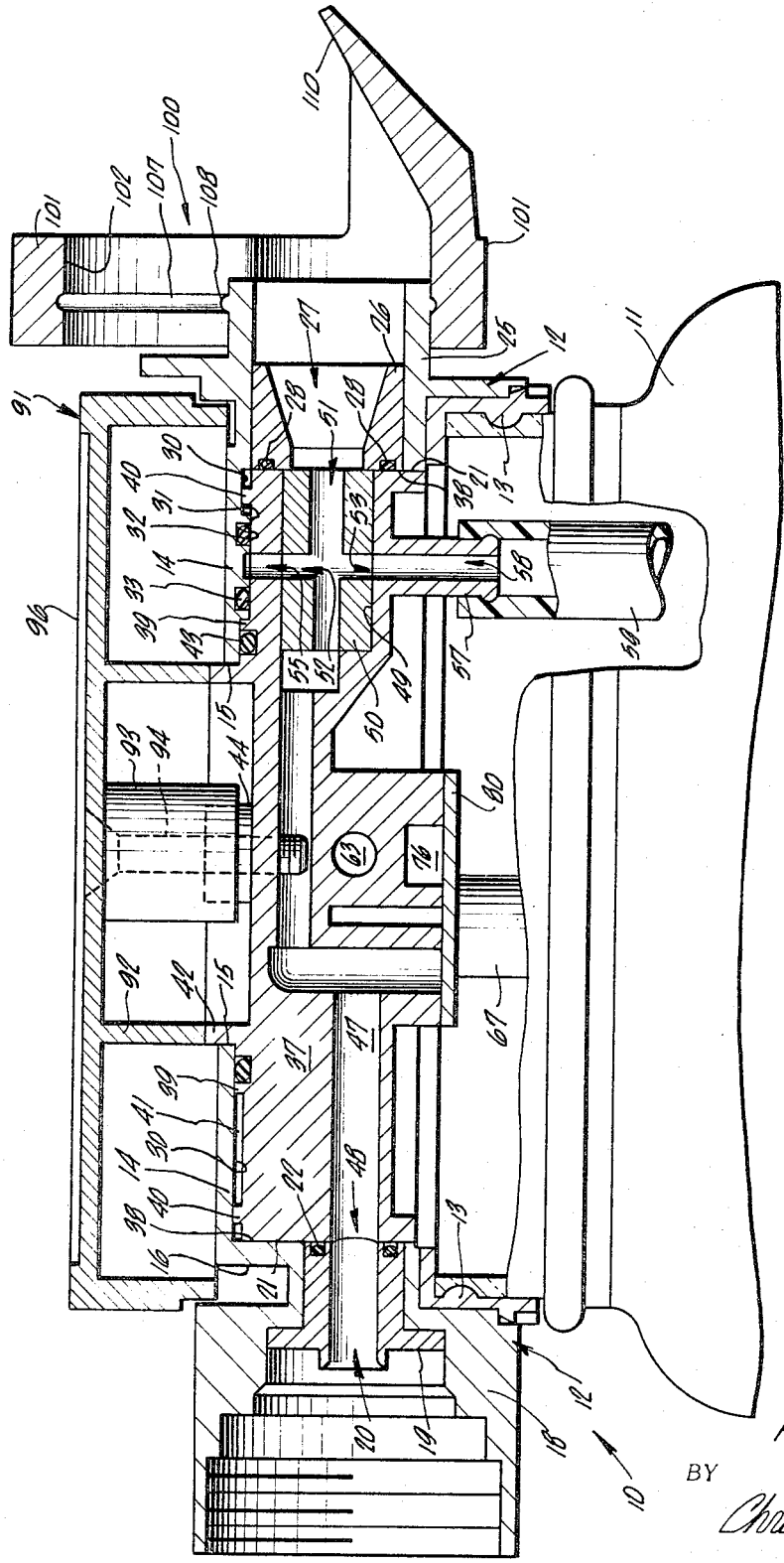

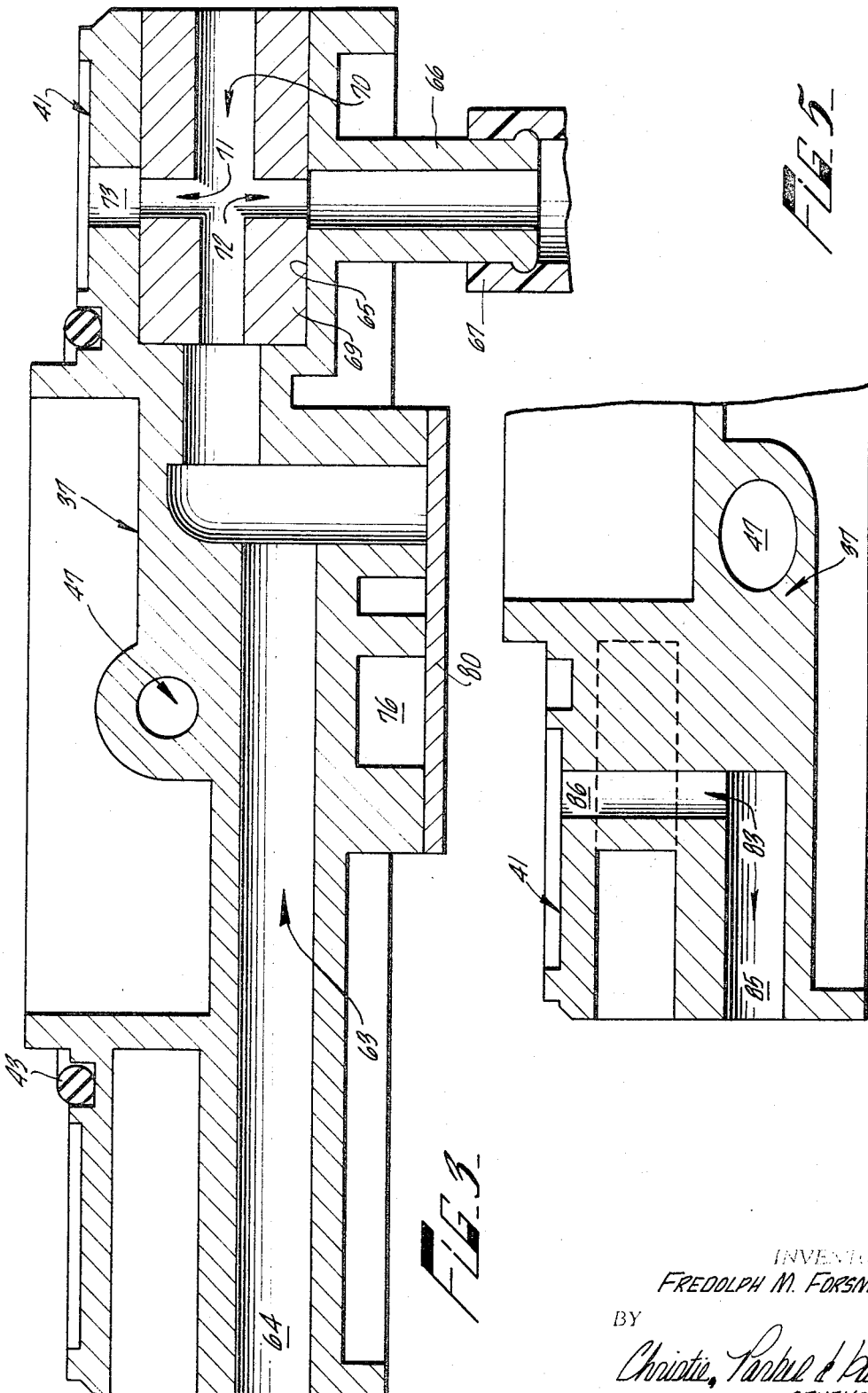

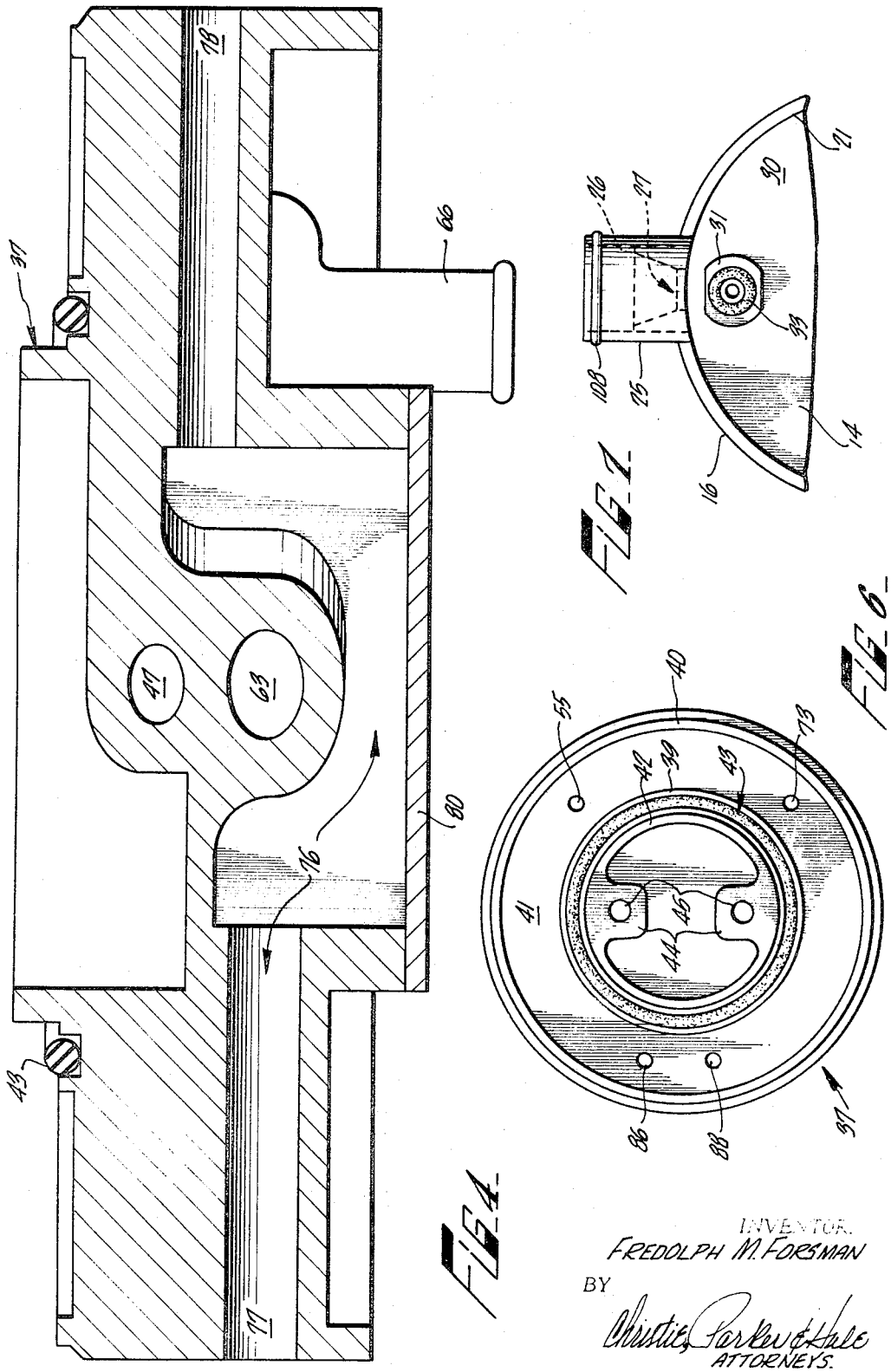

United States Patent Office 3,381,899
Patented May 7, 1968

3,381,899
SPRAY GUN
Fredolph M. Forsman, Altadena, Calif., assignor to Hayes Spray Gun Company, Pasadena, Calif., a corporation of California
Filed Sept. 19, 1966, Ser. No. 580,224
7 Claims. (Cl. 239—317)

This invention relates to an improved spray gun useful for spraying liquid chemicals such as insecticides, fertilizers, and the like.

Known spray guns typically include a container for a liquid to be sprayed, and a housing secured to the top of the container and adapted for coupling to a conventional water hose. Water from the hose passes through a jet in the housing to educt and mix with a metered amount of liquid chemical drawn from the container through a suction line. This mixture is then sprayed from the housing.

Conventional single-jet spray guns lack flexibility in that they are restricted to a single flow rate of the sprayed mixture, and a gardener typically has need for several markedly different flow rates. For example, it is usually desirable to spray insecticides at a relatively low flow rate of say one gallon per minute in order to permit selective spraying of closely spaced plants, and to avoid over-application of the chemical mixture. Liquid fertilizer, on the other hand, is usually highly diluted and applied over a large area such as an entire lawn, and substantially higher flow rates of say three to five gallons per minute are desirable to minimize the time required to complete the fertilizer application.

Another important factor in the application of liquid chemicals is the concentration of the chemical in the sprayed mixture. These chemicals are typically marketed in highly concentrated form, and are diluted by the user according to the manufacturer's recommendations. The user performs an initial dilution by mixing the concentrated chemical with a prescribed amount of water in the spray-gun container. This mixture is then further diluted as it is aspirated from the container and mixed with a stream of water to form the final sprayed mixture, the mixing ratio being determined by the design of the spray-gun jet. Dilution is thus accomplished in two stages, one being controlled by the user, and the other being dependent on the characteristics of the jet.

While concentration of the sprayed mixture in a single-jet spray gun can be varied by adjusting the proportions of water and concentrated chemical blended during the initial dilution step, this style of gun does not meet the need for a variable flow rate. If the gun is designed to provide a low flow rate appropriate for insecticide spraying, it is not well suited for application of fertilizer solutions as an excessive amount of time is required to cover a large area. Similarly, guns designed to provide high flow rates appropriate for fertilizer spraying pose the problems of waste of relatively expensive chemicals and lack of precise target control when spraying insecticides. A flow rate midway between the rates needed for fertilizer and insecticide is sometimes provided, but is an unsatisfactory compromise as it is still too slow for fertilizer and too powerful for insecticides.

Another problem encountered in the operation of known spray guns is clogging of the jet with dried residue of the liquid chemical. A small amount of this liquid remains in the jet after each use of the spray gun. This residual liquid dries and accumulates to form a solid residue which alters the mixing ratio of the jet and eventually clogs the jet completely, forcing disassembly and careful cleaning of the jet, suction line, and associated parts.

With some known spray guns, at least partial cleansing of the jet can be accomplished by blocking the spray outlet while water is flowing into the gun. This ungainly operation is usually done by holding a finger over the spray outlet, and the user often gets spray on his hands, face and clothing in attempting to plug the outlet. Some chemicals may have an adverse effect on skin or clothing, and this untidy operation is avoided by many users. Furthermore, if water is being supplied to the spray gun at high water pressure, the user may find it difficult to apply sufficient force with his finger to block the outlet.

Partial clogging of the jet is a particularly serious problem as it causes a gradual change in the jet mixing ratio which may not be detected by the user. For example, spray guns designed for use with liquid fertilizer typically include a jet which sprays a metered mixture of about 60 parts of water to one part of fertilizer solution drawn from the spray-gun container. Sprayers designed for insecticides typically operate at a lower dilution ratio of say 24 to 1. Any substantial departure from these design ratios decreases the effectiveness of the spraying operation and wastes the liquid chemical due to under or over-dilution. Excessive dilution increases the probability that the insecticide, for example, will be ineffective to control pests, fungus, etc., and insufficient dilution may produce a spray which injures or destroys plant life.

The spray gun of this invention overcomes the clogging problem by providing for water flushing or backwashing through the jet to remove all residual liquid chemical before it dries into a solid cake. The chemical suction line is simultaneously backwashed with water, providing thorough flushing of all surfaces which are sheltered from the normal high-velocity water stream during spraying and hence may accumulate chemical residues. The need for periodic disassembly and manual cleaning is eliminated, and maintenance of a desired mixing ratio in the jet is assured.

In a preferred form, the spray gun of this invention includes two jets to provide a choice of flow rate of the sprayed mixture. One jet is dimensioned to provide a relatively low flow rate and dilution ratio for insecticide spraying, and the other jet provides a substantially higher flow rate and dilution ratio for fertilizer application. The jets are mounted in a rotatable manifold which is selectively indexed into several different positions to provide the desired spray characteristics. An additional position is provided for backwashing of both jets simultaneously, and for filling the spray-gun container with water during the initial dilution of the concentrated chemical to be sprayed.

Briefly stated, the improvement of this invention relates to a spray gun having a container for a liquid chemical. A hollow housing is secured to the container, and the housing has an inlet port adapted for connection to a supply of a carrier fluid (such as water) to be mixed with the chemical, and further has an outlet port through which the mixed chemical and carrier fluids are sprayed.

The improvement comprises a manifold mounted in the hollow housing to be movable from a first to a second position, the manifold having a spray duct and a filling duct therethrough. The spray duct includes an inlet aligned with the inlet port and an outlet aligned with the outlet port when the manifold is in the first position. The manifold has a suction passage and a filling port which open into the spray duct adjacent the spray duct outlet. The filling duct includes an inlet aligned with the housing inlet port when the manifold is in the second position.

A metering jet is mounted in the spray duct adjacent the spray duct outlet, and includes a first transverse passage aligned with the manifold filling port and a second transverse passage aligned with the suction tube. A means is provided to define a channel between an outlet of the filling duct and the filling port. A sealing means is provided to close the filling port when the manifold is in the first position.

This arrangement of components permits carrier fluid to flow longitudinally through the jet to mix with an aspirate liquid chemical through the suction tube when the manifold is in the first position. When the manifold is moved into the second position, carrier fluid flows transversely through the jet into the suction tube, cleaning the jet with the desired backwashing action.

Preferably, the manifold includes a second spray duct therethrough, the second duct having an inlet and an outlet aligned with the inlet and outlet ports of the housing when the manifold is moved to a third position in the housing. The manifold further includes a second suction passage and second filling port opening into the second duct adjacent its outlet. A second metering jet is mounted in the outlet of the second spray duct, and includes a third transverse passage in alignment with the second filling port and a fourth transverse passage in alignment with the second suction passage. The sealing means is positioned to seal the second filling port when the manifold is in the second position. The second filling port is in communication with the channel whereby carrier fluid flows transversely through both jets and respective suction passages when the manifold is in the second position.

The spray gun further preferably includes a spray deflector ring having a pair of overlapping circular openings to fit alternately over a boss on the housing around the outlet port. The ring is formed from a resilient material whereby it can be moved transversely to position the boss in either of the openings without removing the ring from the boss. A deflector blade is secured to the ring in alignment with one of the openings to intercept and divert the fluid being sprayed through the outlet port.

The invention will be described with reference to the attached drawings, in which:

FIG. 2 is a sectional side elevation of an upper portion of the spray gun, taken along line 2—2 of FIG. 1;

FIG. 3 is a sectional elevation of a manifold for the spray gun, taken along line 3—3 of FIG. 1;

FIG. 4 is a sectional elevation of the manifold taken along line 4—4 of FIG. 1;

FIG. 5 is a sectional elevation of the manifold taken on line 5—5 of FIG. 1;

FIG. 6 is a top view of the manifold;

FIG. 7 is a bottom view of a portion of the spray-gun housing, showing a filling-port seal.

Figure 1:
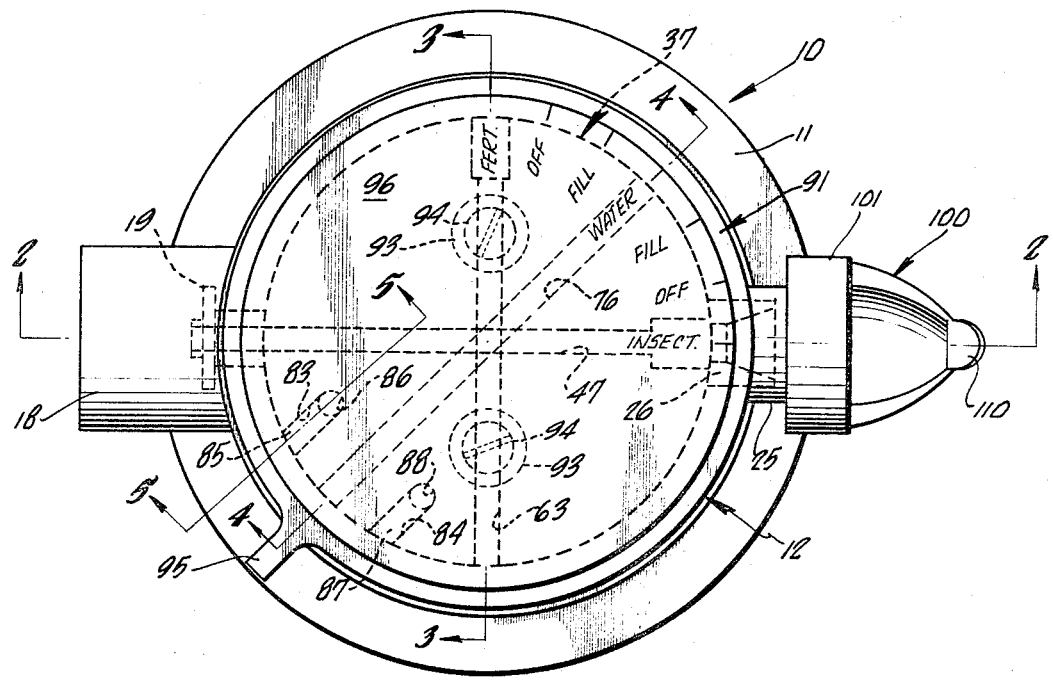
FIG. 1 is a top view of a spray gun in accordance with the invention.

Referring to FIGS. 1 and 2, a spray gun 10 includes a liquid-chemical jar or container 11 having a threaded top. A hollow, generally cylindrical housing 12 is secured to the container by a threaded adapter ring 13 fastened in the underside of the housing. The housing includes a generally horizontal (see FIG. 2) top wall 14 having a central, circular opening 15 therethrough, and a generally cylindrical side wall 16 extending downwardly from the periphery of the top wall.

The rear or left (see FIG. 2) side of side wall 16 includes a hollow boss 18 which is internally threaded to receive a standard male-threaded fitting on a conventional garden hose (not shown). An insert 19 defining a round inlet port 20 is centrally secured in the inner end of boss 18. The inner or right end of the hollow insert is flush with an inner surface 21 of the housing side wall, and is curved to match the circular contour of the side wall. A seal such as an O-ring 22 is seated in an annular groove in the inner end of insert 19 around the inlet port.

A second hollow boss 25 is formed in the front or right side (see FIG. 2) of housing 12 opposite boss 18 and insert 19. A second insert 26 defining an outwardly flared outlet port 27 is secured in boss 25. An inner end of insert 26 is flush with inner surface 21 of housing side wall 16, and is curved to match the circular contour of the side wall. The inner or left end of hollow insert 26 includes a seal such as an O-ring 28 around the outlet port.

Top wall 14 of the housing has an inside surface 30 which is generally flat except for a raised boss 31 (see FIGS. 2 and 7) formed adjacent boss 25 between inlet port 20 and outlet port 27. Boss 31 includes an annular groove 32, and a seal such as an O-ring 33 is seated in the groove.

A generally cylindrical manifold 37 is disposed within housing 12 and has a vertical (see FIG. 2) outer surface 38 making a snug, rotatable slip fit against inner surface 21 of the housing. Referring to FIGS. 2 and 6, the top surface of manifold 37 includes a pair of concentric, annular ribs 39 and 40 which abut inside surface 30 of the housing to define an annular channel 41 between the housing and manifold. An annular flange 42 extends upwardly from the top of the manifold through circular opening 15 in the housing, and makes a snug slip fit against the housing. A seal such as an O-ring 43 is disposed in an annular groove in rib 39 in the manifold top surface. A pair of spaced-apart bosses 44 having threaded holes 45 extend toward each other from flange 42 on the manifold top surface.

In a presently preferred form of the spray gun, the manifold includes three separate spray ducts therethrough. The ducts are selectably indexed into position by rotating the manifold to a desired position as shown in FIG. 1. Two of the ducts include jets for aspirating liquid chemical from the container and mixing the chemical with a carrier fluid such as water from a hose (not shown) coupled to boss 18. The third duct is a "straight through" channel for spraying plain water. The manifold also iscludes a pair of filling ducts which are indexed into position when backwashing of the jets and dilution of the liquid chemical in container 11 is desired.

A first spray duct or "insecticide" duct 47 (see FIG. 2) is formed laterally through the manifold, and has an inlet 48 in alignment with inlet port 20 when the manifold is indexed into the "insecticide" position as shown in FIG. 1. The insecticide duct has an enlarged outlet 49 in alignment with outlet port 27 when the manifold is in the "insecticide" position. A jet 50 is secured in outlet 49, and the jet has a longitudinal passage 51 therethrough.

The downstream portion of passage 51 is enlarged in accordance with conventional eductor design principles to provide aspirating action. The jet may of course also be formed from two separate, spaced-apart collars having central bores. Examples of jets and their design criteria may be found in U.S. Patents Nos. 2,571,871 and 2,592,-896. The jet also defines a first transverse passage 52 extending from the top of the jet into longitudinal passage 51, and a second transverse passage 53 extending from the bottom of the jet into longitudinal passage 51 in alignment with passage 52.

a filling port 55 is aligned with passage 52 in the jet, and extends upwardly through the manifold into communication with channel 41 in the top surface of the manifold. Filling port 55 is radially spaced from the center of the manifold to be positioned inside O-ring 33 when the manifold is in the "insecticide" position. A hollow suction tube 57 is integrally formed on the lower surface of the manifold, and has a suction passage 58 therethrough in alignment with second transverse passage 53 in the jet. A hollow line 59 is fitted over the suction tube, and extends downwardly into a liquid-chemical solution (not shown) in container 11.

Referring to FIG. 3, a second spray duct or "fertilizer" duct 63 extends through the manifold and is angularly spaced from the insecticide duct as seen in FIG. 1. The fertilizer duct is generally similar to the insecticide duct, and includes an inlet 64, enlarged outlet 65, hollow suction tube 66, and a hollow line 67 secured to the suction tube and extending downwardly into the container. A jet 69 is fitted in enlarged outlet 65, and includes a longitudinal passage 70, a first transverse passage 71, and second transverse passage 72 in the same manner as jet 50. A second filling port 73 extends through the manifold to be in communication with channel 41 and passage 71. Filling port 73 is similar to filling port 54 in that it is radially spaced from the center of the manifold to be positioned inside O-ring 33 on boss 31 of the housing when the manifold is indexed into the "fertilizer" position.

Jets 50 and 69 are of conventional design, and are dimensioned to provide a desired mixing ratio of water and liquid chemical. For example, jet 50 in the insecticide duct is typically dimensioned to provide a relatively low flow of a mixture consisting of say 24 parts water to 1 part liquid-chemical insecticide aspirated from the container. Jet 69 in the fertilizer duct is typically dimensioned to provide a relatively high flow rate of say 60 parts water to one part liquid-chemical fertilizer aspirated from the container. The design of these jets is known to those skilled in spray-gun technology, and need not be described in detail.

Referring to FIG. 4, a third spray duct or "water" duct 76 extends through the manifold. The water duct includes an inlet 77 and an outlet 78 positioned in alignment with inlet port 20 and outlet port 27 respectively when the manifold is indexed into the "water" position (see FIG. 1). The water duct is provided to permit spraying of a stream of plain water, and no jet is positioned in this duct as it is unnecessary to aspirate liquid chemical from the container.

The three spray ducts 47, 63 and 76 may be formed through the manifold in a variety of ways, and a presently preferred method of manifold construction is shown in the drawings. This form is adapted for economical molding of the manifold from a plastic material. The ducts are vertically spaced apart at their cross-over point in the center of the manifold as shown in FIGS. 2–4. Thus, duct 47 has an upward step in its central portion, duct 63 has a level central portion and an upward step between its central portion and its enlarged outlet, and duct 76 has a downwardly stepped central portion to pass underneath ducts 47 and 63. The stepped central portions are conveniently formed from the sides and bottom surface of the manifold, and the resulting openings in the bottom surface are closed by a plate 80 secured to the manifold across the openings.

Referring to FIGS. 1, 5 and 6, a pair of filling ducts 83 and 84 are formed in the manifold. Filling duct 83 has an inlet 85 in alignment with inlet port 20 when the manifold is in a "fill" position (see FIG. 1). Duct 83 extends toward the center of the manifold and then upwardly to an outlet 86 in communication with channel 41. Similarly, duct 84 extends horizontally from an inlet 87 and then upwardly to an outlet 88 in communication with channel 41. The manifold can include only a single filling duct, but a pair of filling ducts are preferred so the manifold can be rotated into the "fill" position from either the "fertilizer" or the "insecticide" position without passing through the "water" position.

Referring to FIGS. 1 and 2, a round function-selecting knob 91 has a central, downwardly extending annular flange 92 which abuts the top of annular flange 42 on the manifold. A pair of bosses 93 are integrally formed on the undersurface of the knob on opposite sides of the center of the knob, and extend downwardly to fit over bosses 44 on the manifold. Each boss 93 includes a vertical hole therethrough to accept a pair of screws 94 which are threaded into holes 45 to secure the knob to the manifold. The knob and manifold thus rotate as a unit, and leakage of water from channel 41 through central, circular opening 15 in the housing is prevented by O-ring 43 which is compressed between the manifold and the housing.

A tab 95 extends from one side of the knob to permit convenient rotation of the knob and manifold. A top plate 96 is secured in a recess in the top of the knob, and the top plate includes appropriate indexing designations (see FIG. 1), showing the required knob positions to select a desired spray-gun function.

Figure 8:
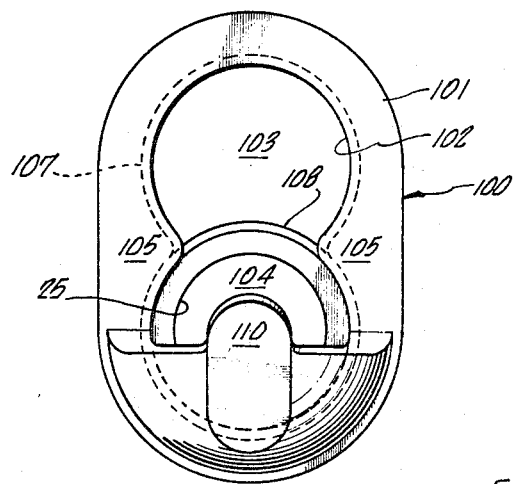
FIG. 8 is a front view of a spray-deflector assembly on the spray gun.

Preferably, the spray gun includes an adjustable spray deflector 100 as shown in FIGS. 2 and 8. The deflector includes a generally oval, hollow deflector ring 101 having an inner surface 102 defining a pair of overlapping circular openings 103 and 104 which intersect each other somewhat in the fashion of a "figure 8." That is, the inner surface of the deflector ring defines an opening which is circular at its upper and lower ends (see FIG. 8), and the circular openings are joined by a narrower opening defined by a pair of opposed thick-walled portions 105 on opposite sides of the deflector ring. Openings 103 and 104 have diameters substantially equal to the outside diameter of boss 25.

Inner surface 102 of the deflector ring includes a continuous groove 107 which mates with an annular rib 108 formed around the periphery of boss 25. The deflector holder is formed of a slightly resilient plastic material, and the sides of the holder can be spread slightly to slide over the end of the boss until rib 108 snaps into groove 107. A curved deflector blade 110 is integrally formed with and extends from the deflector ring.

The component parts of the spray gun are conveniently and economically molded and machined from conventional plastics and other moldable materials. For example, manifold 37 is conveniently formed from plastic sold under the trademark "Delrin," inserts 19 and 26 from nylon, knob 91 and deflector 100 from a plastic sold under the trademark "Cycolon," and housing 12 is die-cast in a zinc alloy sold under the trademark "Zamac 5."

In operation, manifold 37 is rotated by knob 91 to position a specific duct in alignment with the inlet and outlet ports in the housing. For example, in FIGS. 1 and 2, the "insecticide" position has been selected to align duct 47 with the inlet and outlet ports. Water flows through the duct and through jet 50, aspirating liquid insecticide from container 11 and spraying a mixture of water and insecticide through the outlet port. With the manifold in this position, filling port 55 is sealed by O-ring 33 in boss 31 (as shown in FIG. 2) to provide proper aspirating action by the jet.

Similarly, when the manifold is rotated into a "fertilizer" position, duct 63 is positioned in alignment with the inlet and outlet ports with filling port 73 sealed by O-ring 33. A liquid fertilizer solution in container 11 is aspirated through jet 69 and sprayed through the outlet port. When the manifold is rotated into a "water" position, a stream of plain water passes through duct 76 and the outlet port. As shown in FIG. 1, a pair of "off" positions are also provided on the manifold, and water flow through the spray gun is prevented in these positions by seal 22 and the absence of a cooperating duct through the manifold.

When the manifold is rotated into either of the two "fill" positions, water flows through filling duct 83 or 84 to circulate through channel 41. With the manifold in this position, filling ports 55 and 73 are no longer sealed by O-ring 33 and are in communication with channel 41. Water therefore flows down through both filling ports, backwashing the transverse passages in both jets as well as the suction tubes and lines which extend into the container. This jet flushing or backwashing action may be carried out with container 11 removed from the spray gun. Alternatively, the backwashing is carried out simultaneously with dilution of a concentrated liquid chemical in container 11.

If it is desired to deflect the stream of sprayed liquid emerging from outlet port 27, adjustable deflector 100 is positioned as shown in FIGS. 2 and 8 whereby the stream strikes blade 110 to be deflected from its normal path. The direction of deflection is selected by rotating deflector ring 101 to a desired position. If deflection is not needed in the spraying operation, deflector ring 101 is snapped downwardly to position opening 103 in front of the outlet port. The deflector holder spreads resiliently to allow thick-wall portions 105 to pass over the end of hollow boss 25.

There has been described a versatile spray gun which provides means for backwashing of one or more jets in a manifold to avoid clogging deposits of liquid chemical. Although the invention has been described in a form which includes multiple ducts and jets for spraying different mixtures of liquid chemical and water, as well as plain water, it is to be understood that the invention can be incorporated in single-jet designs or other styles of spray guns. It is intended that all such variations and modifications fall within the scope of the appended claims.

I claim:
1. In a spray gun having a container for a liquid chemical and a hollow housing secured to the container, the housing having an inlet port adapted for connection to a supply of a carrier fluid to be mixed with the chemical, and having an outlet port through which the mixed chemical and carrier fluid is sprayed, the improvement comprising:
   a manifold mounted in the hollow housing to be movable from a first to a second postion, the manifold having a first spray duct and a filling duct therethrough, the first spray duct having an inlet aligned with the inlet port and an outlet aligned with the outlet port when the manifold is in the first position, the filling duct having an inlet aligned with the inlet port when the manifold is in the second position, the manifold having a suction passage and a filling port which open into the spray duct adjacent the spray duct outlet;
   a metering jet mounted in the spray duct adjacent the spray duct outlet and having a first transverse passage in alignment with the manifold filling port and a second transverse passage in alignment with the suction passage;
   means defining a channel between an outlet of the second duct and the filling port; and
   means for sealing the filling port when the manifold is in the first position;
   whereby carrier fluid flows longitudinally through the jet to mix with and aspirate liquid chemical through the suction passage when the manifold is in the first position, and carrier fluid flows transversely through the jet into the suction passage when the manifold is in the second position.

2. The spray gun defined in claim 1 in which the manifold further includes a second spray duct therethrough, the second spray duct having an inlet aligned with the inlet port and an outlet aligned with the outlet port when the manifold is moved to a third position in the housing, the manifold having a second suction passage and a second filling port which open into the second spray duct adjacent the second spray-duct outlet; and further comprising a second metering jet mounted in the second spray duct adjacent its outlet and having a third transverse passage in adjustment with the second filling port and a fourth transverse passage in alignment with the second suction passage; the sealing means being positioned to seal the second filling port when the manifold is in the third position; the second filling port being in communication with the channel whereby carrier fluid flows transversely through both jets and respective suction passages when the manifold is in the second position.

3. The spray gun defined in claim 2 in which the channel-defining means comprises a pair of spaced-apart annular ribs on the manifold, the ribs extending away from the manifold into contact with the housing to define a channel between the manifold, housing, and ribs, the filling duct outlet and filling ports opening into the channel between the ribs.

4. The spray gun defined in claim 3 in which the transverse passages in each respective jet are aligned with each other.

5. The spray gun defined in claim 4, and further comprising a hollow circular boss on the housing around the outlet port, a ring having a pair of overlapping, substantially circular openings of substantially the same diameter as an outer surface of the boss whereby the ring is mountable on the boss with the boss extending into either of the openings, the ring being formed of a resilient material whereby it can be moved transversely to position the boss in either of the openings without removing the ring from the boss, and a deflector blade secured to the ring in alignment with one of the openings to intercept and divert the fluid being sprayed through the outlet port.

6. In a spray gun having a housing and a hollow circular boss on the housing, the boss defining an outlet port through which a fluid is sprayed, an improved spray deflector comprising a ring having a pair of overlapping, substantially circular openings of substantially the same diameter as an outer surface of the boss with the boss extending into either of the openings, the ring being formed of a resilient material whereby it can be moved transversely to position the boss in either of the openings without removing the ring from the boss, and a deflector blade secured to the ring in alignment with one of the openings to intercept and divert the fluid being sprayed through the outlet port.

7. The spray deflector defined in claim 6 in which the boss includes an annular rib around its outer surface, and the ring defines an annular groove around its inner surface and opening into the circular openings, the rib and groove being engageable to secure the ring rotatably on the housing.

References Cited
UNITED STATES PATENTS

| | | | |
|---|---|---|---|
| 544,928 | 8/1895 | Patterson | 239—505 X |
| 1,458,975 | 6/1923 | Clauson | 239—317 |
| 1,967,909 | 7/1934 | Sonner | 239—317 X |
| 3,106,347 | 10/1963 | Hayes | 239—507 X |
| 3,132,808 | 5/1964 | Ott | 239—112 X |
| 3,254,844 | 6/1966 | Blasnik et al. | 239—318 |
| 3,291,395 | 12/1966 | Sharp | 239—318 |

SAMUEL F. COLEMAN, *Primary Examiner.*